United States Patent
Gaillet (12) 
(10) Patent No.: US 11,175,833 B2
(45) Date of Patent: Nov. 16, 2021

(54) METHOD FOR CONTROLLING A DATA STORAGE DEVICE BASED ON A USER PROFILE, AND ASSOCIATED DATA STORAGE DEVICE

(71) Applicant: ORANGE, Paris (FR)

(72) Inventor: Thierry Gaillet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 18 days.

(21) Appl. No.: 16/446,032

(22) Filed: Jun. 19, 2019

(65) Prior Publication Data

US 2019/0391750 A1     Dec. 26, 2019

(30) Foreign Application Priority Data

Jun. 21, 2018 (FR) ...................................... 1855481

(51) Int. Cl.
*G06F 3/06* (2006.01)
*G06F 13/16* (2006.01)
*G06F 13/42* (2006.01)

(52) U.S. Cl.
CPC .......... *G06F 3/0622* (2013.01); *G06F 3/0637* (2013.01); *G06F 3/0659* (2013.01); *G06F 3/0673* (2013.01); *G06F 13/1668* (2013.01); *G06F 13/4282* (2013.01); *G06F 2213/0042* (2013.01)

(58) Field of Classification Search
CPC .. G06F 13/1668; G06F 13/4282; G06F 21/10; G06F 2213/0042; G06F 3/0622; G06F 3/0637; G06F 3/0659; G06F 3/0673; H04L 63/10; H04W 12/08
See application file for complete search history.

(56) References Cited

U.S. PATENT DOCUMENTS

| | | | |
|---|---|---|---|
| 2004/0095382 A1 | 5/2004 | Fisher et al. | |
| 2006/0195654 A1* | 8/2006 | Challener | G06F 3/0637 711/112 |
| 2006/0259785 A1* | 11/2006 | Thibadeau | G06F 21/80 713/193 |

(Continued)

OTHER PUBLICATIONS

English translation of the French Search Report and Written Opinion dated Feb. 12, 2019 for corresponding French Application No. 1855481, filed Jun. 21, 2018.

*Primary Examiner* — Jane Wei (74) *Attorney, Agent, or Firm* — David D. Brush; Westman, Champlin & Koehler, P.A.

(57) ABSTRACT

A method for controlling a data storage device is provided, which includes: upon detecting a use of the device by a user, determining whether the user corresponds to an identifier associated with a first user profile including access rights authorizing at least the writing and reading of data in a memory of the data storage device; if it is determined that the user corresponds to the identifier associated with the first user profile, controlling the use of the data storage device according to the first user profile; and if it is determined that the user does not correspond to the identifier associated with the first user profile, controlling the use of the data storage device according to a second user profile including access rights which permit the writing of data in the memory of the data storage device and which prohibit at least the reading of data, in the memory of the data storage device, that were not previously written by the user.

14 Claims, 2 Drawing Sheets

(56) References Cited

U.S. PATENT DOCUMENTS

| | | | |
|---|---|---|---|
| 2009/0300710 A1* | 12/2009 | Chai | G06F 21/6218 |
| | | | 726/1 |
| 2013/0046741 A1* | 2/2013 | Bentley | G06F 16/1873 |
| | | | 707/695 |
| 2016/0085564 A1 | 3/2016 | Arcese et al. | |
| 2016/0359862 A1 | 12/2016 | Riva et al. | |
| 2016/0378976 A1 | 12/2016 | Kotary et al. | |
| 2018/0157860 A1* | 6/2018 | Nair | G06F 9/45558 |

* cited by examiner

METHOD FOR CONTROLLING A DATA STORAGE DEVICE BASED ON A USER PROFILE, AND ASSOCIATED DATA STORAGE DEVICE

CROSS-REFERENCE TO RELATED APPLICATIONS

This application claims priority to and the benefit of French Patent Application No. FR 18 55481, filed Jun. 21, 2018, the content of which is incorporated herein by reference in its entirety.

FIELD OF THE DISCLOSURE

The present invention relates to a method for controlling a data storage device, and to a device for implementing this method. It applies in particular to portable data storage devices, for example such as a USB (Universal Serial Bus) key, an SD card, or a removable storage disk.

BACKGROUND OF THE DISCLOSURE

Whether in the professional or the private sector, these days it is common to exchange data both online and via physical media, which raises issues concerning the protection and security of the data, particularly during such exchanges.

In particular, when a user wishes to obtain files from a third party by sharing a USB key, it may pose a problem for him to allow the third party to access the files already stored on the USB key.

There is a known software solution called AirDrop (registered trademark) from the company Apple Inc., which allows a user to upload data to another user's mobile, tablet, or computer via a wireless connection (or WiFi for Wireless Fidelity).

However, this software solution requires that a wireless connection be available and that both persons (the user of the device providing the data and the user of the device receiving the data) have activated this specific function, which remains proprietary and restricted to Apple's ecosystem only.

SUMMARY

An object of an exemplary embodiment of the present invention is to at least partially overcome the above disadvantages.

Another object of an exemplary embodiment of the present invention is to provide a solution that is easy to use while addressing a wider audience, regardless of the ecosystem used.

According to a first aspect, a method is provided for controlling a data storage device, comprising: upon detecting a use of the device by a user by connection to a computing device, determining whether the user corresponds to an identifier associated with a first user profile including access rights authorizing at least the writing and reading of data in a memory of the data storage device; if it is determined that the user corresponds to the identifier associated with the first user profile, controlling the use of the data storage device according to the first user profile; and if it is determined that the user does not correspond to the identifier associated with the first user profile, controlling the use of the data storage device according to a second user profile including access rights which permit the writing of data in the memory of the data storage device and which prohibit at least the reading of data, in the memory of the data storage device, that were not previously written by the user.

Thus, a data storage device can be controlled using a first user profile provided for allowing at least the writing and reading of data in memory of the data storage device, and a second user profile provided for at least prohibiting the reading of data, stored in the memory of the device, that were not previously written in the memory by the user having this second profile. Therefore, any user having the second user profile can write data in the memory of the storage device, but as they have no read access rights, cannot view the data previously written in the memory of the storage device except for those data the user himself or herself has written, which advantageously guarantees that the confidentiality of the data stored in the memory of the storage device is protected against users other than those associated with the first user profile while allowing a second-profile user to check the writes that he or she has made in the memory of the device, for example by viewing these writes from a graphical user interface.

The proposed solution also has the advantage of being independent and universal, particularly as it is not limited to a particular ecosystem, whether from the point of view of the data storage device or of a computing device with which the storage device is used.

In addition, the proposed solution allows an intermediate storage of data, by making use of a storage device that can be external, physical, and secure. This avoids a direct transfer of data between two computing devices (for example between a smartphone and a personal computer), which is not always desired by users, and offers a very useful alternative in cases where such a direct transfer of data between two computing devices is not possible.

The proposed solution advantageously also makes it possible to share data between a plurality of users or to communicate data corresponding to all types of content (presentations, photos, videos, recordings, etc.) while avoiding the use of transfer and/or online sharing services, as these services are time consuming, have volume limitations, and may not be considered as providing sufficient data security or privacy. It therefore provides an alternative that greatly reduces the risk of data theft as well as the risk of disclosing confidential data.

In one or more embodiments, the access rights included in the first user profile further authorize the deletion of data in the memory of the data storage device, and the access rights included in the second user profile further prohibit the deletion of data in the memory of the data storage device. In this case, the first and second user profiles are configured to be even more distinct (and separated by the granted permissions) from each other. This greater distinction between the two profiles makes it possible to provide a user of the first profile with rights to read, write, and delete data, while prohibiting second-profile users from deleting data in the memory of the data storage device, including data they themselves have written in the memory, which advantageously reinforces security for first-profile users, during use of the device by second-profile users. Thus, from the point of view of the first-profile users, the use of the device by second-profile users is more circumscribed and thus more secure. For example, this advantageously allows the use of a device owned by a first-profile user that is shared with other users not of the first profile, without any trust relationship existing between the first-profile user and the other users of the device.

In one or more embodiments, the access rights included in the second user profile prohibit the reading of any data stored in the memory of the data storage device. Thus, the control of a data storage device can be carried out using a first user profile provided to allow at least the writing and reading of data in the memory of the data storage device, and a second user profile provided to at least prohibit the reading of data stored in the memory of the device. Any user having the second user profile can write data to the memory of the storage device, but because they have no read access rights they cannot see the data that has been written in the memory of the storage device, regardless of the user profile (first or second profile) of the users who have written data in the memory of the storage device, which further enhances the confidentiality of the data stored in the memory of the storage device, against users other than those associated with the first user profile.

In one or more embodiments, the access rights included in the second user profile only authorize the writing of data in the memory of the data storage device and access to information about the available data storage capacity in the memory of the storage device. In this case, security during use of the device by second-profile users is advantageously even greater. For example, a second-profile user will only be able to find out if there is any available space in the memory of the storage device, and write data (for example store files) in the memory if sufficient space remains available.

In one or more embodiments, the access rights included in the second user profile are applicable to a predefined partition of the memory of the data storage device. A correspondence can thus advantageously be defined between a memory partition created in the memory space of the device, for example to be used as a drop zone, and the actions that can be performed by a second-profile user, which facilitates management of the memory space of the storage device to take into account the access rights associated with the second user profile.

In one or more embodiments, the second user profile comprises access rights prohibiting access to information about the data stored in the memory of the storage device. For example, the second user profile comprises access rights that prohibit displaying information, on a display device, about the data stored in the memory of the storage device. The access rights associated with the second user profile can thus be restricted to prohibit access (through displaying or via another user interface) to information about the data stored in the memory of the device, which advantageously reinforces the security for first-profile users during use of the device by second-profile users, as well as protecting the confidentiality of data stored in the memory of the storage device, against users other than those associated with the first user profile.

In one or more embodiments, the second user profile includes access rights authorizing access to information about an available data storage capacity in the memory of the storage device. This case advantageously allows a second-profile user to know whether there is any available space in the memory of the storage device before considering writing data therein, which facilitates management of the memory space of the device by all users, preventing for example the situation where a second-profile user who, depending on the embodiment, may or may not have read access to the memory of the device, including in a "drop zone" of the memory, and begins to write data in the memory of the device when the available space is insufficient for writing the data.

In one or more embodiments, wherein the access rights included in the second user profile only authorize the writing of data in the memory of the data storage device. The access rights of second-profile users are then advantageously limited to only the writing of data, which maximizes security for first-profile users during use of the device by second-profile users, as well as the confidentiality of data stored in the memory of the storage device. For example, the storage device may be a secure storage medium (USB key, SD card, removable disk, etc.) that only authorizes one "owner" profile for the person who can read, edit, and delete files that are stored therein, and forcing a "guest" or "write-only" mode for everyone else who can only place files there.

In one or more embodiments, the identifier associated with the first user profile is stored in the memory of the data storage device. This facilitates controlling the device as proposed, particularly in cases where such control is carried out by a device other than the storage device, at least in part, and in contrast in other embodiments allows a completely autonomous operation of the device.

In one or more embodiments, the determination of a correspondence between the user and the identifier associated with the first user profile comprises an identification of the user on the basis of the identifier associated with the first user profile. This determination of a correspondence between the user and the identifier associated with the first user profile may advantageously further comprise an authentication of the user on the basis of the identifier associated with the first user profile. This authentication advantageously makes it possible to reinforce the security during use of the device, especially in cases where the rights associated with the first user profile are very open (reading, writing (including modifying), deleting data).

According to another aspect, a data storage device is provided comprising: a processor, a memory, and a data transfer interface configured for exchanging data with a computing device when the communication device is connected to said computing device, wherein the processor is configured to implement a method for controlling the data storage device according to one of the embodiments proposed in the present description.

Depending on the embodiment chosen, the data storage device may be implemented in the form of a USB key, an SD card, a removable storage disk, etc. In addition, the data transfer interface is not limited, for example by its configuration, to a particular computing device or particular type of computing device. Depending on the embodiment, the data transfer interface may be configured to exchange data with different computing devices or types of computing devices, such as a computer, a personal computer (PC), a tablet, a smartphone, an industrial console, a vehicle dashboard, a camera, etc.

According to yet another aspect, a removable data storage device is provided comprising a data storage device as proposed above, wherein the data transfer interface is of the Universal Serial Bus (USB) type.

Another aspect relates to a computer program, loadable into a memory associated with a processor, and comprising portions of code for implementing a method as proposed in the present description during the execution of said program by the processor.

Another aspect relates to a set of data representing, for example in compressed or encoded form, a computer program as proposed in the present description.

Another aspect relates to a non-transitory storage medium for a computer-executable program, comprising a set of data representing one or more programs, said one or more programs comprising instructions for, during the execution of said one or more programs by a computer comprising a processor operatively coupled to a memory and to a data communication input/output interface, causing the computer to control a non-transitory data storage device according to a method for controlling a data storage device according to one of the embodiments proposed in the present description.

BRIEF DESCRIPTION OF THE DRAWINGS

Other features and advantages will be apparent from the following description of some non-limiting exemplary embodiments, with reference to the appended drawings, in which.

In the following detailed description of some embodiments of the invention, many specific details are presented in order to enable a more complete understanding. However, those skilled in the art can see that some embodiments can be implemented without these specific details. In other cases, well-known features are not described in detail in order to avoid unnecessarily complicating this description. The proposed method can be implemented by any type of data storage device, for example a removable storage medium or a data storage peripheral such as a portable hard drive, a USB key, or an SD (Secure Digital) card.

DETAILED DESCRIPTION OF ILLUSTRATIVE EMBODIMENTS

Figure 1:
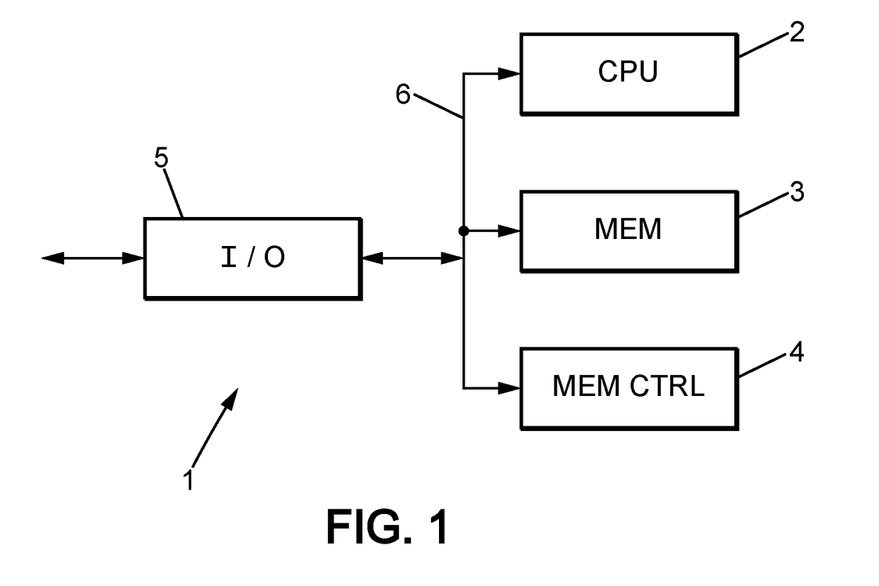
FIG. 1 is a diagram illustrating an exemplary architecture of a data storage device for implementing one or more embodiments of the proposed method.

FIG. 1 schematically illustrates an example of a data storage device 1 configured for implementing the proposed control method in one or more embodiments.

As illustrated in the figure, the data storage device (1) may comprise an interface (5), a controller (2), a memory (3), and a memory management unit (4). Depending on the embodiment, the interface (5), the memory (3), and the memory management unit (4) may be operatively coupled to the controller (2) by a communication bus (6), or by any communication link, possibly comprising one or more hardware connectors. In the architecture of the data storage device (1) illustrated in FIG. 1, the interfaces (5), memory (3), memory management unit (4), controller (2), and communication bus (6) together form a data storage device, which may further include other components, units, or functions not shown in the figure.

The controller (2) may comprise one or more processors, such as a central processing unit (CPU) or some other hardware processor, an associated memory (for example a random access memory (RAM), a cache memory, a flash memory, etc.), and be able to be configured to control the interface (5), the memory (3), and the memory management unit (4), in order to command the use of the data storage device (1) in accordance with one or more embodiments of the proposed method, for example by executing a computer program comprising portions of code to implement a method for controlling the data storage device (1) as proposed in the present description. Depending on the embodiment, the memory (3) and/or an associated memory of the controller (2) contain instructions which, when executed by the controller (2), cause the controller (2) to carry out or control the interface (5) and/or memory management (4) parts of the examples of implementing the proposed method described in the present description. The controller (2) may be a component making use of a processor or a calculation unit to control a data storage device according to the proposed method and to control the memory management unit (4) of the device (1), for example such as a microcontroller.

The memory (3) preferably comprises non-volatile memory, for example flash memory, and depending on the embodiment chosen may be implemented in the form of one or more memory components mounted on a circuit board, in the form of one or more electronic circuits integrated in an electronic component of the storage device, in the form of or integrated into an autonomous device not necessarily comprising other elements of the data storage devices, for example in the form of a memory card (SD (Secure Digital) memory card, micro SD (Micro Secure Digital Card) card, SD High Capacity (SDHC—Secure Digital High Capacity) card, SD extended capacity (SDXC—Secure Digital eXtended Capacity) card.

Depending on the chosen embodiment, the memory management unit (4) may be implemented in the form of one or more pieces of software, or a combination of hardware and software, configured to implement embodiments of the control method described in the present description. The software portion of the memory management unit may be or be part of the driver for the data storage device. In the following, we will designate as "driver" a set of one or more pieces of software configured to implement a method for controlling a storage device as proposed in the present description. Depending on the architecture of the device, the driver is configured to be executable on a processor of the storage device, and/or on a processor of a computing device to which a portion of the storage device (comprising the memory (3)) is connected.

In one or more embodiments, the driver may comprise user interface software, for example such as a graphical user interface (GUI), configured among other things for allowing configuration of the storage device by a user, as described below, and for providing users with information on the data stored in the memory of the storage device, based on their respective user profiles.

Depending on the embodiment chosen, the interface (5) may be implemented in the form of a combination of hardware and software, and may comprise one or more connectors and an interface driver, for example executable by the controller (2), and loaded in the memory of the controller (2), in the memory (3) of the storage device, or in any other memory accessible by a processor configured for executing the driver for the interface. In one or more embodiments, the interface (5) may comprise a data transfer interface and a power supply interface, each of these interfaces comprising at least a connector and an interface driver.

For example, the interface (5) may be of the USB (Universal Serial Bus) type, and comprise at least one data transfer connector, and at least one power supply connector, the data transfer and power supply connectors being in a format compliant with one of the USB standards (USB 1.0, USB 1.1, USB 2.0, USB 3.0, USB 3.1, and USB 3.2) as published by the USB Implementers Forum, and/or their evolutions. When the interface (5) is of the USB type, the interface drivers are also configured to comply with one of the existing USB standards and/or their evolutions.

According to another example, the interface (5) may be an SD or micro SD card interface, and comprise at least one data transfer connector and at least one power supply connector, the data transfer and power supply connectors being in a format compliant with one of the SD card standards (SD, mini SD, and micro SD) as developed by the SD Card Association (SDA), and/or their evolutions. When the interface (5) is of the SD card type, the interface drivers are also configured to comply with one of the existing SD card standards and/or their evolutions.

The device (1) may be implemented in software form, in which case it takes the form of a program executable by a processor, or in hardware form, such as an application specific integrated circuit (ASIC), a system-on-chip (SOC), or in the form of a combination of hardware and software elements, for example a software program intended to be loaded and executed in a FPGA (Field Programmable Gate Array) type of component. The systems-on-chip (SOC) are embedded systems that integrate all components of an electronic system into a single chip. An ASIC (Application-specific Integrated Circuit) is a specialized electronic circuit that groups custom functions for a given application. ASICs are usually configured during manufacture and can only be simulated by the user. Programmable logic circuits of the Field Programmable Gate Array (FPGA) type are electronic circuits that are reconfigurable by the user.

The data storage device (1) may also use hybrid architectures, for example architectures based on a CPU+FPGA, a GPU (Graphics Processing Unit), or an MPPA (Multi-Purpose Processor Array).

Depending on the embodiment, different architectures of the data storage device may be adopted, both for the hardware part of the device and for the software part of the device, where appropriate.

For example, in one embodiment, the set of elements forming the data storage device (in the example of FIG. 1, this set comprises the interface (5), the memory (3), the memory management unit (4), the controller (2), and the communication bus (6)) can be grouped together in the same equipment, apparatus, or device, for example such as a USB key, a memory card, a SIM (Subscriber Identity Module) card, or an eSIM module. Such a configuration (centralized architecture) has the advantage of offering a data storage device capable of autonomously implementing a control method as proposed in the present description, by the embedded driver which is executable by the processor it is equipped with. Also, in one or more embodiments, the proposed storage device control scheme can be implemented in any memory card having a processor or by a circuit board or an electronic component in which the elements that form the storage device, both hardware and software as the case may be, are integrated and/or installed.

In another embodiment, at least some of the elements forming the data storage device (which include, in the example of FIG. 1, the interface (5), the memory (3), the memory management unit (4), the controller (2), and/or the communication bus (6)) can be distributed over a plurality of equipment items, apparatuses, or devices. For example, with reference to FIG. 1, the memory (3) of the storage device may be a removable data storage medium, such as a removable memory card (for example an SD card of normal, mini, or micro format), while the controller (2) may comprise, in one embodiment, a microcontroller for managing the embedded memory of the card, or in another embodiment, a processor of a device to which the memory card is connected. This device may be any computing device capable of controlling a memory card to which it is connected, for example such as a computer, a personal computer (PC), an industrial console, a vehicle dashboard, a mobile phone, a tablet, a digital camera, a digital videocamera, etc.

In other embodiments using a distributed architecture, the storage device may comprise a removable storage medium, such as a USB key or an SD card, with or without an internal microcontroller, and a driver configured for controlling the use of the removable storage medium, executable by a processor that is not part of the storage device, for example the processor of a computer to which the storage device is connected.

Such configurations (in a distributed architecture) have the advantage of enabling the implementation of a control method as proposed in the present description on any data storage medium, in particular a removable storage medium, for example such as any USB key or SD memory card commercially available.

For example, in one or more embodiments, with reference to FIG. 1, the memory management unit (4) of the storage device (1) can be implemented in the form of software (a computer program comprising instructions in the form of software code: source code, executable and/or object code, executable by a processor to which the memory (3) (for example an SD card) is connected), possibly integrated with a driver for the data storage medium.

Those skilled in the art will understand that the proposed method for controlling a data storage device is not limited to a particular architecture of the data storage device, and that it can be implemented on devices having a different architecture than presented above, for example combining the above architectures within a hybrid architecture.

Methods for configuring a data storage device for implementing the control method according to one or more embodiments are described below.

In one or more embodiments, the memory of the data storage device may be partitioned into a plurality of partitions.

Figure 2:
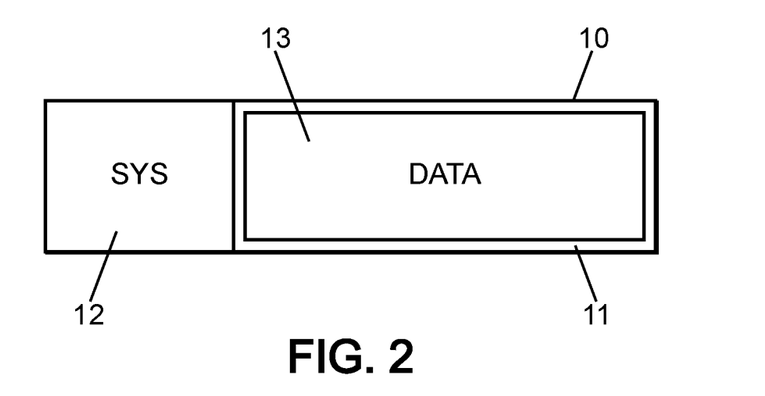
FIG. 2 illustrates a partitioning of a memory of a data storage device for implementing one or more embodiments of the proposed method.

With reference to FIG. 2, two partitions (11, 12) can thus be created in the memory (10) of the storage device, one of them (12), called the system partition, being reserved for system data of the device. The other partition (11) may be used for storing data in a context of using the data storage device.

Alternatively, a plurality of partitions intended for data storage may be defined.

It is thus possible to define a data drop zone (13), such as an area of the memory of the data storage device, possibly corresponding to one or more partitions of the memory of the device.

In the example illustrated in FIG. 2, the drop zone (13) can be defined as coinciding with the data storage partition (11) in the memory (10) of the device.

In the case where several data storage partitions are created in the memory of the device, the drop zone can be defined as coinciding with one or more of these data storage partitions.

The partitions thus created in the memory of the data storage device can then be formatted according to any type of file system format, such as the FAT (File Allocation Table) format or the NTFS format. Preferably, the FAT format is used to generate a file allocation table in a format compatible with many operating systems (including Windows, MacOS, Linux, or Android) for computers, tablets, or smartphones.

In one or more embodiments, the system partition may be configured for storing one or more drivers for the storage device, after it has been formatted. With reference to FIG. 1, the system partition may in particular store software for the memory management unit (4) in the embodiments where the memory management unit (4) is implemented, at least in part, in the form of software stored at least in part in the memory of the storage device.

In one embodiment called "firmware mode", corresponding in one or more embodiments to the centralized architecture described above, the software of the memory management unit may be configured to be executed by the processor of the controller (2) of the storage device (1). In this case it can be preloaded into the memory of the storage device, for example during an initial configuration of the storage device in a context of manufacturing the device. This software is thus designed to be embedded in the storage device, and to be executed upon detecting a use of the storage device by a user, for example in one embodiment when the storage device is connected to a computing device such as a computer, a tablet, a smartphone, a personal computer (PC), a drone, an industrial console, a vehicle dashboard, etc.

In this embodiment, the storage device is a smart device as it comprises a processor and a memory in which a driver, designed to be executed autonomously by the processor, is loaded.

Preferably, the system partition of the memory of the storage device can be read, write, and delete protected so that the software (firmware) for controlling the storage device loaded in this partition system is not corrupted, intentionally or not.

For example, a USB key configured in firmware mode can be offered to users with embedded software, which makes it a smart key. In this case, it is not necessary to obtain a driver (for example by downloading drivers from a server, or by updating the operating system running on the computing device to which the key is connected), the embedded software being configured to provide different functionalities when it is executed by a processor of the key, and for example load a specific OS, manage specific cryptography, etc.

In another embodiment called "driver mode", corresponding in one or more embodiments to the distributed architecture described above, the processor of the controller (2) of the storage device able to execute the software of the memory management unit (4) may be a processor of a first computing device (for example a computer, a smartphone, a tablet, a drone, a camera, a digital videocamera, a personal computer (PC), an industrial console, a vehicle dashboard etc.) to which a second computing device comprising the memory (3) (for example a USB key, a memory card (SD type)) is connected.

This software can thus be configured to be executed in a processor of the first computing device, after having been loaded into the memory of this first computing device (for example by downloading drivers from a server, or by updating the operating system executed on the first computing device), upon detecting a use of the storage device by a user, for example when the second computing device is connected to the first computing device. This software may also be integrated into a driver of the second computing device that a user must obtain in order to use the second computing device.

For example, a user wishing to use a USB key or an SD card according to a control method as proposed in the present description can first obtain a driver for the USB key (or respectively for the SD card) which will include a memory management unit configured for implementing a control method as proposed in the present description. Management of the access rights of a user, described hereinafter in one or more embodiments of the control method proposed here, is then implemented by the execution of the driver for the USB key (respectively for the SD card) by a processor of the computing device to which the USB key (respectively the SD card) is connected.

A USB key configured in driver mode can thus be used after installation and upon execution of a driver for the key, from the computing device to which the key is connected, regardless of the user of this computing device. Thus, any standard commercially available USB key can advantageously be used to implement the control method proposed in the present description, provided that each user of the key obtains, installs, and executes a driver for the key on the computing device to which the key is connected.

In embodiments where the device is configured in driver mode, the device can advantageously be configured to allow automatic recognition of a use of the storage device by a user, for example by automatic recognition of a connection of the second computing device to the first computing device, so as to trigger the execution of the driver on the first computing device once this driver has been installed on the computing device, at each use of the storage device (for example upon connection of the second computing device to the first computing device).

In addition, the first loading of the driver on this first computing device can advantageously be simplified by using an "autorun" type of software, configured to obtain the driver for the device upon detecting a connection of the second computing device to the first computing device, and upon determining that the driver is not installed on the first computing device.

In one or more embodiments, the driver for the key may be configured to perform encryption of the data stored in one or more of the memory partitions of the storage device, according to an encryption algorithm such as a symmetric-key encryption algorithm (for example DES, IDES, RC2, RC4, RC5, etc.) or an asymmetric encryption algorithm (for example RSA, DSA, ECC, etc.).

For example, in one embodiment using a system partition, the data stored in this partition can be encrypted to protect their integrity from users of the device, particularly when the device is configured in firmware mode and the driver is stored in a system partition of the memory device.

In one or more embodiments, the driver for the key may further be configured to offer or require a user of the device to encrypt the data stored in the memory of the data storage device, upon detecting data stored in the memory which are not encrypted.

In one or more embodiments, the driver for the key may further be configured to offer or require a user of the device to create one or more partitions in the memory of the device, for example to configure a drop zone for data, upon detecting an absence of partitions and/or an absence of data storage partitions configured in the memory of the device. In this embodiment, the driver may further be configured to recognize that one or more partitions have already been configured in the memory of the device, for example to recognize that one or more data storage partitions have already been configured in the memory of the device (and in particular a drop zone) and not to offer to create partitions in the memory of the device in these cases.

In one or more embodiments (in particular those corresponding to driver mode), the formatting of the partition or partitions created in the memory of the storage device may be carried out according to a specific format, for example with a specific file allocation table (and in particular different from a table compliant with the FAT standard), to prevent the files stored in the memory of the storage device from being visible to a user using a standard driver. Thus, the memory of a data storage device in the form of a standard USB key can be formatted in a proprietary format, for example by generating a data allocation table in memory having a proprietary format, creating, and/or encrypting a data allocation table in memory (such as a file allocation table), so that files stored in the memory of the USB key cannot be visible to any user using a standard driver able to control a standard USB key.

In one or more embodiments (in particular those corresponding to firmware mode or to driver mode), a software interface, for example an Application Programming Interface (API), may be provided and loaded into the system partition and configured to allow access to the data stored in this partition, in particular the data of the software of the memory management unit, in order to exchange data with the memory management unit, carry out corrective maintenance and/or enhancements to the software of the memory management unit, etc.

A data drop zone area can thus be configured in the memory of the data storage device, by using memory partitioning, formatting, and/or encryption specific to this area.

Various embodiments of the proposed method for controlling a data storage device are described below.

The control of a proposed data storage device uses at least two user profiles for the device, a first user profile including access rights authorizing at least the writing and reading of data in a memory of the data storage device, and a second user profile including access rights authorizing the writing of data in the memory of the data storage device and prohibiting at least the reading of data in the memory of the data storage device which were not previously written by the user.

In one or more embodiments, these user profiles can be created and configured during a phase of configuring the data storage device by a first user, for example a user who owns the device, and then can be saved in the memory of the data storage device.

Configuring a user profile can typically include defining the access rights available to users corresponding to the profile, among which are permission to write data in the memory of the storage device (possibly including permission to modify data written in the memory of the storage device), permission to read data stored in the memory of the storage device, and permission to delete data stored in the memory of the storage device.

The configuration of a user profile may further comprise the creation of at least one association between the user profile and a user, for example by means of a user identifier.

The configuration of the device, and in particular the configuration of the user profiles, advantageously may be carried out in one or more embodiments by means of a graphical user interface, possibly integrated with a software application executed on a computing device (for example a smartphone or tablet) to which the storage device is connected for its configuration.

Alternatively, the first and second user profiles may have been preconfigured on the storage device, so that their configuration by a user of the device may only comprise the creation of at least one association between at least one user profile and a user, for example creating an association between at least one user and the first user profile.

In one or more embodiments, only one or more associations between the first user profile and at least one user can be created, the users of the storage device who are not associated with the first user profile being considered by default to be associated with the second user profile.

For example, a first user of the storage device, identified by a user identifier Id_owner, can be associated with the first user profile including access rights authorizing at least the writing and reading of data in a memory of the data storage device, by means of his or her identifier Id_owner. All other users of the storage device, assuming none of them are associated with the first user profile, are then considered by default as being associated with the second user profile including access rights that allow writing data in the memory of the data storage device and prohibiting at least the reading of data in the memory of the data storage device.

Also, in one or more embodiments, a user of the storage device is associated with one or the other of the first and second user profiles, by default or explicitly by configuring the profile.

Figure 3:
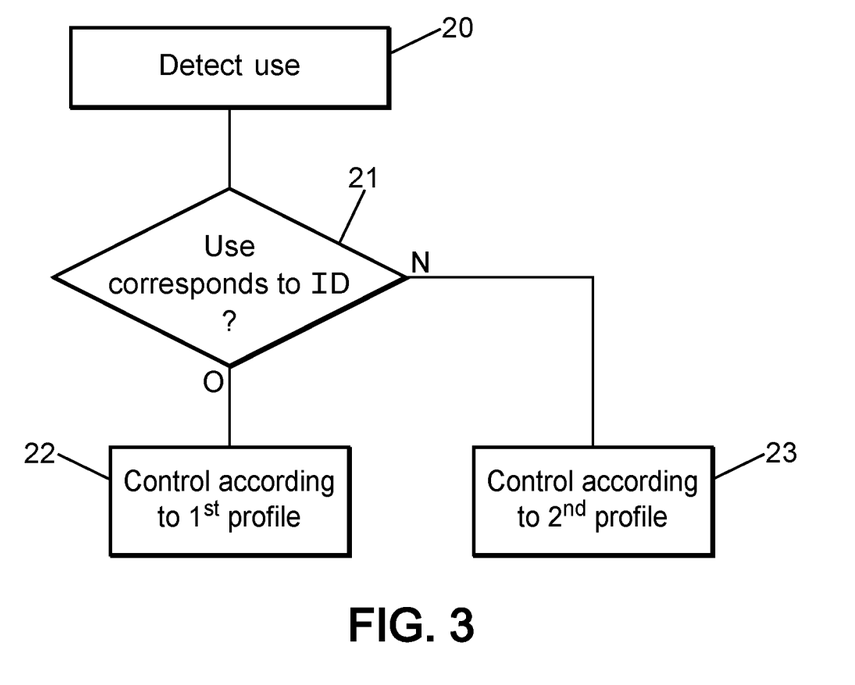
FIG. 3 is a flowchart illustrating the proposed method according to one or more embodiments.

With reference to FIG. 3, in one or more embodiments, controlling the storage device may comprise the detection (step 20) of a use of the device by a user, by detecting that the device has been connected to a computing device such as a personal computer (PC), a computer, a smartphone, a tablet, a camera, a video camera, a drone, an industrial console, a vehicle dashboard, or in general to any computing or electronic device to which the storage device can be connected, whether via a wired or wireless connection.

For example, in the case of a storage device equipped with a USB interface, the USB driver able to be executed by a processor of the storage device can detect that the storage device is being supplied electricity by means of the USB interface, and therefore the storage device is currently in use.

Following the detection of a use of the device by a user, it can be determined (step 21) whether the user corresponds to an identifier associated with the first user profile, for example the user identifier Id_owner described above, associated with the first user profile.

If it is determined that the user corresponds to the identifier associated with the first user profile, the use of the data storage device is controlled according to the first user profile (step 22), thus providing the user with access rights permitting at least the writing and reading of data in the memory of the storage device.

Conversely, if it is determined that the user does not correspond to the identifier associated with the first user profile, the use of the data storage device is controlled according to the second user profile (step 23), permitting the user to write data in the memory of the data storage device but prohibiting him or her at least from reading data, in the memory of the device, that were not previously written by that user.

In one or more embodiments, the identifier associated with the first user profile is an identifier (for example a predetermined identifier) that can be stored in the memory of the data storage device so as to advantageously allow autonomous operation of the data storage device.

As a variant, the identifier associated with the first user profile is an identifier (for example a predetermined identifier) that can be stored in the memory of one or more data servers, as described above, for example as part of a Cloud service, in which case the data storage device may be configured to query these one or more data servers upon detecting a use of the device.

In this case, the data of the user profile(s) generated, and/or the data associating these profiles with users, can be stored and managed remotely in remote data servers. For example, user identification elements ("credentials") may be managed remotely and not stored in the storage medium. This embodiment has the advantage of providing better security for the user identification elements, for example in case of loss or theft of the storage device.

Conversely, user identification elements may be managed locally, in other words within the storage device, advantageously in order to allow completely autonomous operation of this device.

In one or more embodiments, the determination of a correspondence between the user and the identifier associated with the first user profile may comprise an identification of the user on the basis of the identifier associated with the first user profile, possibly as well as an authentication of the user.

Depending on the embodiment, this user identification may use any type of user identification element, such as an identifier and password pair entered by the user then verified by the data storage device itself or by a data server queried by the data storage device depending on where the identifier associated with the first user profile is stored, etc.

The authentication can use any type of authentication element (voice authentication, fingerprint authentication, etc.). Such identification and/or authentication may be carried out according to any authentication protocol and/or authentication that are known per se, for example such as Mobile Connect in embodiments where the storage device is equipped with a SIM card or an eSIM module.

In one or more embodiments, the access rights associated with the second user profile that authorize the reading of data if these data were previously written by the user of the device can be managed in the context of sessions corresponding to a connection of the device to a computing device. For example, the second profile can be configured to give a user of this profile read access to data that he or she has written in the memory of the device (for example, deposited in a "drop zone" of the device) during a utilization session corresponding to the period during which the user used the device by connecting it to the computing device. The control of the device can then be configured to terminate the utilization session when a predetermined condition is satisfied, such as detecting a disconnection of the device from the computing device, or expiration of a pre-configured length of time. The user of the second profile will therefore have read access, for example via a graphical user interface, for the duration of his utilization session, to the data that he or she writes in the memory of the device. This advantageously allows the user to control what he or she writes in the memory of the device for the duration of the session. The second profile may also be configured so that, following the expiration of his or her utilization session, the user no longer has access to the data that he or she has written in the memory of the device during the utilization session that has now expired.

Alternatively, in one or more embodiments, the access rights associated with the second user profile that authorize the reading of data if these data were previously written by the user of the device can be managed on the basis of an identification (possibly combined with an authentication) of the user having the second profile, such identification and where applicable authentication possibly, depending on the embodiment, being implemented for the configuration of the second profile similarly to what is described in the present description for the identification and authentication of a first-profile user. It is possible to implement this management of second-profile users using an identification, possibly combined with an authentication, only for certain second-profile users. This has the advantage of allowing second-profile users to access data that they have previously written in the memory of the storage device, independently of the concept of a utilization session as explained above.

In these embodiments, a second-profile user who identifies himself or herself when using the device, can have read access to the data that he or she has written in the memory of the device. The control of the device can thus be configured to manage associations between a second-profile user identifier and data written in memory by this user, associations that can be stored in memory, for example in the memory of the storage device.

In one or more embodiments, the access rights associated with the second user profile prohibit the reading of data written in memory, independently of the second-profile user who wrote these data. This configuration of the access rights associated with the second user profile allows simplified management of the access rights associated with the second profile, while reinforcing the confidentiality protection for the data written in the memory of the device.

In embodiments in which the storage device as proposed is implemented with a memory card inserted into an electronic or computing device, such as a smartphone or a tablet, and the proposed control method is implemented by means of a driver for controlling the memory card, possibly integrated with a native software application executed on the smartphone or on the tablet, the identification and/or authentication performed by the driver can use the identification and/or the authentication implemented for the use of the smartphone or tablet as appropriate, in particular such as the identification and/or authentication elements used for accessing social networks on the smartphone or tablet.

In one or more embodiments, the memory of the storage device may be configured to define a memory area (drop zone) to which accesses are controlled according to the control method described in the present description. In these embodiments, the access rights included in the second user profile may be configured to be applicable to that memory area. In other embodiments, these access rights included in the second user profile may be configured to be confined to that memory area of the data storage device, and thus only applicable to that memory area.

In one or more embodiments, the memory of the storage device may be configured to comprise one or more partitions, a partition being for example defined as a data drop zone to which access is controlled according to the control method described in the present description. In these embodiments, the access rights included in the second user profile may be configured to be applicable to a predefined partition of the memory of the data storage device, corresponding for example to the data drop zone. In other embodiments, these access rights included in the second user profile may be configured to be confined to a predefined partition of the memory of the data storage device, and to apply only to that partition.

In addition, in one or more embodiments, the second user profile may be configured to manage access to only one partition of the memory of the storage device, for example the drop zone, so that the other partitions which may have been created and configured in the memory of the storage device are not accessible or visible to a user associated with the second user profile.

In one or more embodiments, while the first user profile is configured to include access rights further authorizing the deletion of data in the memory of the data storage device, the second user profile may be configured on the contrary to include access rights further prohibiting the deletion of data in the memory of the data storage device. In this case, while the first user profile includes access rights authorizing the reading and writing as well as the deletion of data stored in the device memory, the second user profile includes access rights that do indeed authorize the writing of data in the memory of the device, but prohibit the reading of data and the deletion of data stored in the memory of the device. Thus, not only are the users associated with this second profile unable to read the stored data, they cannot delete them either.

In one or more advantageous embodiments, the access rights included in the second user profile may be restricted only to the writing of data in the memory of the data storage device. In this particular case, a user not associated with the first user profile, and recognized as such during his or her use of the storage device, can only place data in the memory of the storage device. The user will not have any access to information concerning the data stored in the memory of the storage device, whether the data are stored by that user or by another user, and he or she will not be able to take any action involving them. The confidentiality of data stored in the memory of the storage device, managed by a user associated with the first user profile, can thus advantageously be optimized by limiting the rights associated with the second user profile as much as possible, in particular concerning writing/reading/modification/deletion access rights.

In one or more embodiments, the second user profile includes rights to access information about the data stored in the memory of the storage device. A user having the first user profile, for example the owner of the storage device, may indeed wish to grant or not grant partial or complete access to this information to users having the second user profile.

In one embodiment, the second user profile may include access rights prohibiting access to information about the data stored in the memory of the storage device. In this case, a user having the second user profile may not have any access to information about the data stored in the memory of the storage device, and in particular in the drop zone (for example the "drop zone" partition) in embodiments where this has been defined. For example, the second user profile may include access rights prohibiting the display, on a display device, of information about the data stored in the memory of the storage device. Depending on the embodiment, the display device may be integrated in the data storage device, or in a computing device to which the data storage device is connected (for example the display screen of a computer, a smartphone, a tablet, a camera, etc. to which a USB key or a memory card is connected, and on which a driver is executed for the key or the card incorporating a graphical interface controller in order to display information about the key or card).

This embodiment may preferably be combined with the embodiments in which the access rights of the second user profile are particularly restricted, for example to only the writing of data in the memory (for example in a predefined drop zone) of the storage device.

In another embodiment, the second user profile may include access rights allowing access to information about the available data storage capacity in the memory of the storage device. This embodiment may also advantageously be combined with embodiments in which the access rights of the second user profile are particularly restricted, for example to only the writing of data in the memory (for example in a predefined drop zone) of the storage device.

In this case, a user having the second user profile can obtain information, for example by means of a display device, relating to the storage capacity available for writing data in the memory of the device, when write access is allowed in the second profile. Depending on the embodiment, the display device here again may be integrated in the data storage device, or in a computing device to which the data storage device is connected.

In embodiments where the rights defined for the second user profile are confined to a preconfigured area of the memory of the device ("drop zone") corresponding where appropriate to a partition of the memory of the device, information about the available data storage capacity in the memory of the storage device that is accessible to second-profile users is preferably limited to information about an available data storage capacity in the preconfigured area of the memory of the device ("drop zone").

In one embodiment, the available storage capacity information that is accessible to the second user profile users can be updated as the second-profile users write data (for example, by copying data files) into the memory of the device.

In one or more embodiments, the control of the data storage device may comprise the creation and then the updating of a log of accesses to the memory of the storage device.

Depending on the embodiment chosen, the access log may concern only the area(s) of the memory of the device controlled according to the first and second user profiles proposed herein, the accesses made by a user having the first user profile or the second user profile, the accesses made by any user not having the first user profile; or may concern only the area(s) of the memory of the device controlled according to the second user profile proposed herein (such as for example a drop zone as described above, which may occupy a partition of the memory space of the device).

In addition, only the first user profile preferably may be configured to have access to this access log, at least read access, or even read and write and/or delete access.

In one or more embodiments, controlling the data storage device may include configuring, and enabling/disabling a data deletion manager for data written in the memory of the device. The deletion manager may be configured to delete data stored in the memory of the device after the expiration of a lapse of time configured for a predetermined duration and initiated when writing data to be deleted in the memory of the device, and/or configured to delete data stored in the memory of the device periodically (for example every day).

Depending on the embodiment chosen, the deletion manager may be configured to process data written by any user who does not have the first user profile, to process data written in a specific area of the memory of the device (for example such as the drop zone described above) regardless of the profile of the user who wrote these data, or to process data written in a specific area of the memory of the device by any user who does not have the first user profile (and in particular by any user having the second user profile).

This method of automatically deleting data written in the memory of the data storage device advantageously makes it possible to ensure the transitory nature of the storage of data placed in the memory of the storage device by users who do not have the first user profile. The latter can thus be reassured, for example in the case where they wish to share sensitive data temporarily by storing them in the memory of a storage device controlled according to the proposed method, for the purposes of a presentation.

According to a first exemplary use, a USB key may have been configured to be controlled according to the method proposed in the present description. The USB key may have been configured in firmware mode, in other words a firmware-type driver is preloaded in memory, in which case this is an intelligent key as it can operate autonomously, i.e.

without the need to load and run driver software on any computer to which the key is connected. Alternatively, the USB key may be a standard USB key and be used in driver mode, in other words it is controlled by the driver loaded and run on a computer to which the key is connected. The available memory in the key may have been partitioned to define a "drop zone" partition, and the partitions may have been formatted, possibly according to a proprietary scheme as described above. Alternatively, a "drop zone" may have been configured in one of the partitions of the memory space of the key. The driver for the key may have been configured to define a first user profile having all access rights to the memory of the key, including the "drop zone", and to define a second user profile having access rights that only authorize writing data in the "drop zone" and obtaining information on the memory storage capacity available in the "drop zone".

When the USB key is used by connecting the key to a computer, the driver may be configured to start running and query the user in order to determine whether or not the user is associated with the first user profile. If the user is not associated with the first user profile, he or she may be associated by default with the second user profile. The user can thus place data files in the "drop zone" in order to share them with a user of the first user profile, without being able to see the data already stored in the "drop zone", with the exception of the files that this user has stored in the "drop zone". He or she may also find out the available storage capacity in the "drop zone", for example by means of a graphical interface displayed on the screen of his or her computer, this capacity being updated as files are placed in the "drop zone". The user may also be informed that his or her data will be stored for a predetermined time in the "drop zone" (for example 1 hour) before they are erased by the driver for the key.

A first-profile user can access the data deposited in the "drop zone" by another user, after successful identification and possibly authentication. He or she can thus read, modify, move, and delete the files deposited in the "drop zone", and can access the access log to find out about write accesses by other users.

The USB key as described above may advantageously be used to allow the participants of a meeting to share their respective presentation files by temporarily storing them in the "drop zone" of the USB key provided by one of the participants, for example the organizer of the meeting, or by a trusted third party. The confidentiality of the data shared by each participant other than the provider of the key is protected against the others because the "drop zone" appears to each participant as an empty memory space, possibly with information about the remaining available storage space in the "drop zone". The USB key can thus be shared by several users who are not first-profile users, each of these users placing his or her data on the key without being able to see the other data stored therein when the key is connected to his or her computing device. The supplier of the USB key, having the first user profile, can then compile all the presentations in the "drop zone". As explained above, the driver for the key may further be configured to delete data stored in the "drop zone" after a predetermined time and/or periodically.

A second exemplary implementation relates to a secure storage medium (USB key, SD card, removable disk, etc.) allowing only one "owner" profile for the person who can read, edit, and delete files deposited thereon, and forcing a "guest" or "write-only" mode for everyone else who can only place files therein. The "owner" of the medium must first initialize it during a simple configuration phase, consisting of partitioning the total volume by reserving a drop zone and creating a password to protect it from read accesses thereafter. Each "guest" will only see blank media from their system/file explorer on their personal computer. The only information will be the size available. This capacity may be managed during attempts to deposit files. In addition, after each deposit, the file may or may not be visible to the person who initiated it, depending on the embodiment.

Such simplicity in the experience requires software development to provide drivers for circumventing the usual operation of media inserted into computers. These drivers are of two types, which may be combined: (1) resident application or system extension for computers (for example Kernel extension: KEXT on MacOS), and (2) firmware for the medium itself (for example for a specially formatted key). The embodiment depends on the experience desired and on the constraints: An application allows the use of standard media but requires software installation prior to the first use, and this is true for each guest. Firmware does not require any configuration or prior installation for guests but requires specific media.

The storage capacity of the medium makes it possible to use it not only as a temporary space for exchanges but also as a longterm backup. In one embodiment, the firmware of the medium can count the number of interactions (reads and writes) but also the time elapsed between them, in order to initiate an automatic "self erasing" deletion.

Depending on the embodiment chosen, certain acts, actions, events, or functions of each of the methods described herein may be performed or occur in a different order than that in which they were described, or may be added, merged, or may not be performed or occur, as the case may be. In addition, in some embodiments, certain acts, actions, or events are performed or occur concurrently and not successively.

Although described via a number of detailed exemplary embodiments, the proposed control method and the device for implementing an embodiment of the method comprise various variants, modifications, and improvements which will be apparent to those skilled in the art, it being understood that these various variants, modifications, and improvements fall within the scope of the invention, as defined by the following claims. In addition, various aspects and features described above may be implemented together or separately, or may be substituted for one another, and all of the various combinations and sub-combinations of the aspects and features fall within the scope of the invention. In addition, some of the systems and devices described above may not incorporate all the modules and features described for the preferred embodiments.

The invention claimed is:

1. A method for controlling a data storage device, comprising the following acts performed by the data storage device:

upon detecting a use of the data storage device by a user by connection to a computing device, determining whether the user corresponds to an identifier associated with a first user profile including access rights authorizing at least writing and reading of data in a memory of the data storage device;

determining whether the user corresponds to the identifier associated with the first user profile and:

in response to determining that the user corresponds to the identifier associated with the first user profile, controlling the use of the data storage device according to the first user profile, otherwise controlling the use of the data storage device according to a second user profile by default, the second user profile including access rights which, for all users not corresponding to the identifier associated with the first user profile, permit the writing of data in the memory of the data storage device and which prohibit at least the reading of data, in the memory of the data storage device, that were not previously written by the user.

2. The method according to claim 1, wherein the access rights included in the first user profile further authorize deletion of data in the memory of the data storage device, and the access rights included in the second user profile further prohibit the deletion of data in the memory of the data storage device.

3. The method according to claim 1, wherein the access rights included in the second user profile only authorize the writing of data in the memory of the data storage device and access to information about available data storage capacity in the memory of the storage device.

4. The method according to claim 1, wherein the access rights included in the second user profile are applicable to a predefined partition of the memory of the data storage device.

5. The method according to claim 1, wherein the second user profile comprises access rights prohibiting access to information about the data stored in the memory of the storage device.

6. The method according to claim 5, wherein the second user profile comprises access rights prohibiting display on a display device of information about the data stored in the memory of the storage device.

7. The method according to claim 1, wherein the second user profile includes access rights authorizing access to information about an available data storage capacity in the memory of the storage device.

8. The method according to claim 1, wherein the access rights included in the second user profile prohibit the reading of any data stored in the memory of the data storage device.

9. The method according to claim 1, wherein the access rights included in the second user profile only authorize the writing of data in the memory of the data storage device.

10. The method according to claim 1, wherein the identifier associated with the first user profile is stored in the memory of the data storage device.

11. The method according to claim 1, wherein the determination of a correspondence between the user and the identifier associated with the first user profile comprises an identification of the user on the basis of the identifier associated with the first user profile.

12. The method according to claim 11, wherein the determination of a correspondence between the user and the identifier associated with the first user profile further comprises an authentication of the user on the basis of the identifier associated with the first user profile.

13. A data storage device, comprising:
a processor,
a memory, and
a data transfer interface, configured for exchanging data with a computing device when the data storage device is connected to said computing device,
wherein the processor is configured to implement a method for controlling the data storage device, wherein controlling comprises:
upon detecting a use of the data storage device by a user by connection to the computing device, determining whether the user corresponds to an identifier associated with a first user profile including access rights authorizing at least writing and reading of data in the memory of the data storage device;
determining whether the user corresponds to the identifier associated with the first user profile and:
in response to determining that the user corresponds to the identifier associated with the first user profile, controlling the use of the data storage device according to the first user profile, otherwise controlling the use of the data storage device according to a second user profile by default, the second user profile including access rights which, for all users not corresponding to the identifier associated with the first user profile, permit the writing of data in the memory of the data storage device and which prohibit at least the reading of data, in the memory of the data storage device, that were not previously written by the user.

14. The data storage device according to claim 13, wherein the data storage device is a removable data storage device, and wherein the data transfer interface is of the Universal Serial Bus (USB) type.

* * * * *